United States Patent [19]

Hara et al.

[11] Patent Number: 5,021,639

[45] Date of Patent: Jun. 4, 1991

[54] AUTOMATIC BANK NOTE TRANSACTION APPARATUS

[75] Inventors: Junichiro Hara, Tokyo; Hideaki Miyahara, Kanagawa, both of Japan

[73] Assignee: Kabushiki Kaisha Toshiba, Kanagawa, Japan

[21] Appl. No.: 363,742

[22] Filed: Jun. 9, 1989

[30] Foreign Application Priority Data

Jun. 30, 1988 [JP] Japan .............................. 63-163925

[51] Int. Cl.[5] .............................................. G06F 15/30

[52] U.S. Cl. ..................................... 235/379; 235/380

[58] Field of Search ................ 235/379, 380; 364/408; 194/206

[56] References Cited

U.S. PATENT DOCUMENTS 4,602,332 7/1986 Hirose et al. ........................ 235/379

4,745,266 5/1988 Miura ................................. 235/379

*Primary Examiner*—Harold Pitts

*Attorney, Agent, or Firm*—Finnegan, Henderson, Farabow, Garrett, and Dunner

[57] ABSTRACT

An automatic bank note transaction apparatus according to the present invention is provided. First and second storing section store bank note, and a first conveying path conveys bank notes from the first storing section to the bank note dispensing port. A third storing section is provided for storing the bank note as they are loaded. A second conveying path is used for conveying the bank notes from the third storing section to the first and second storing section. A designation switch is provided for causing the second convey path to start the loading operation. A control section for operates to specify the second conveying path to alternately convey the bank note into the first and second storing section in units of a predetermined number of bank note when the loading operation is specified. The bank notes are alternately conveyed and stacked into the first and second storing section in units of a predetermined number so that the loading operation is continually performed.

3 Claims, 14 Drawing Sheets

AUTOMATIC BANK NOTE TRANSACTION APPARATUS

BACKGROUND OF THE INVENTION

The present invention relates to an automatic bank note transaction apparatus and more particularly, to an automatic bank note transaction apparatus installed in a bank branch operating to receiving/dispensing bank notes or bills.

Recently, various types of depositing/dispensing apparatus have been efficiently used as automatic bank note transaction apparatuses. These automatic banking transaction apparatuses have been known as automatic teller machines (ATMs) which are installed in automated corners of bank branches. These ATMs allow customers to automatically withdraw and deposit cash (bank notes). The ATM can continue to serve even outside banking hours. Therefore, ATMs can be installed in department stores and supermarkets, and the number of ATMs being installed is increasing and will continue to do so.

In a prior ATM is disclosed in U.S. Pat. No. 4,602,332 owned by same assignee as a present invention. In this device, every morning a bank clerk loads a mixture of bank notes of a first and second denomination into a loading/receiving cassette. The loading/receiving cassette is set in the ATM. A bank clerk depress a loading button, and the first and second denominations of bank notes are taken out and conveyed to first and second temporary storage sections. When the either one of the first and second temporary storage sections becomes full, the conveying device is prevented from conveying the bank notes from the loading/receiving cassette. After the loading operation is stopped because a temporary storage section is full, a stacking device stacks the bank notes stored in the full temporary storage section into a storage section. The above operation is repeated until the loading/receiving cassette becomes empty.

At the end of banking hours, a clerk depress a summing button. Upon depression of the summing button, the bank notes in the first and second storage section are taken out one by one and recovered to the loading-/receiving cassette. When the loading/receiving cassette becomes to full, a bank clerk takes out the full loading/receiving cassette and inserts an empty loading/receiving cassette.

In the above described ATM, the bank notes are temporarily stored into the temporary storage section in units of a predetermined number of bank notes (e.g., 100 sheets) and then are stacked in the storage section. Therefore, the loading operation is stopped every time of predetermined number of bank notes are stacked in the temporary storage section.

As a result, in the above apparatus cannot be loading or unloading continuously, but instead requires a long time for the loading and unloading loading operation.

SUMMARY OF THE INVENTION

Accordingly, it is an object of the present invention to provide an automatic transaction apparatus capable of continuously performing the loading operation and thus increasing the loading speed.

The second object of the present invention is to proved an automatic transaction apparatus capable of continuously performing the bank note recovering operation and thus increasing the speed thereof.

The object of the present invention are achieved by providing an improved automatic bank note transaction apparatus including a first and second storing section for storing bank note, a first conveying path for conveying bank notes from the first and second storing section to the bank note dispensing port, a third storing section for storing the loaded bank notes, a second conveying path for conveying the bank note from the third storing section to the first and second storing section, designation switch for causing the second convey path to start a loading operation, and control section for causing the second conveying path to alternately convey the bank note into the first and second storing section in units of a predetermined number of bank notes when the loading operation is specified.

BRIEF DESCRIPTION OF THE DRAWINGS

The drawings illustrate an automatic bank note transaction apparatus (ATM) according to one embodiment of the present invention in which.

DETAILED DESCRIPTION OF THE PREFERRED EMBODIMENT

An automatic bank note transaction apparatus (ATM) according to one embodiment of the present invention will be described with reference to the accompanying drawings.

Figure 1:
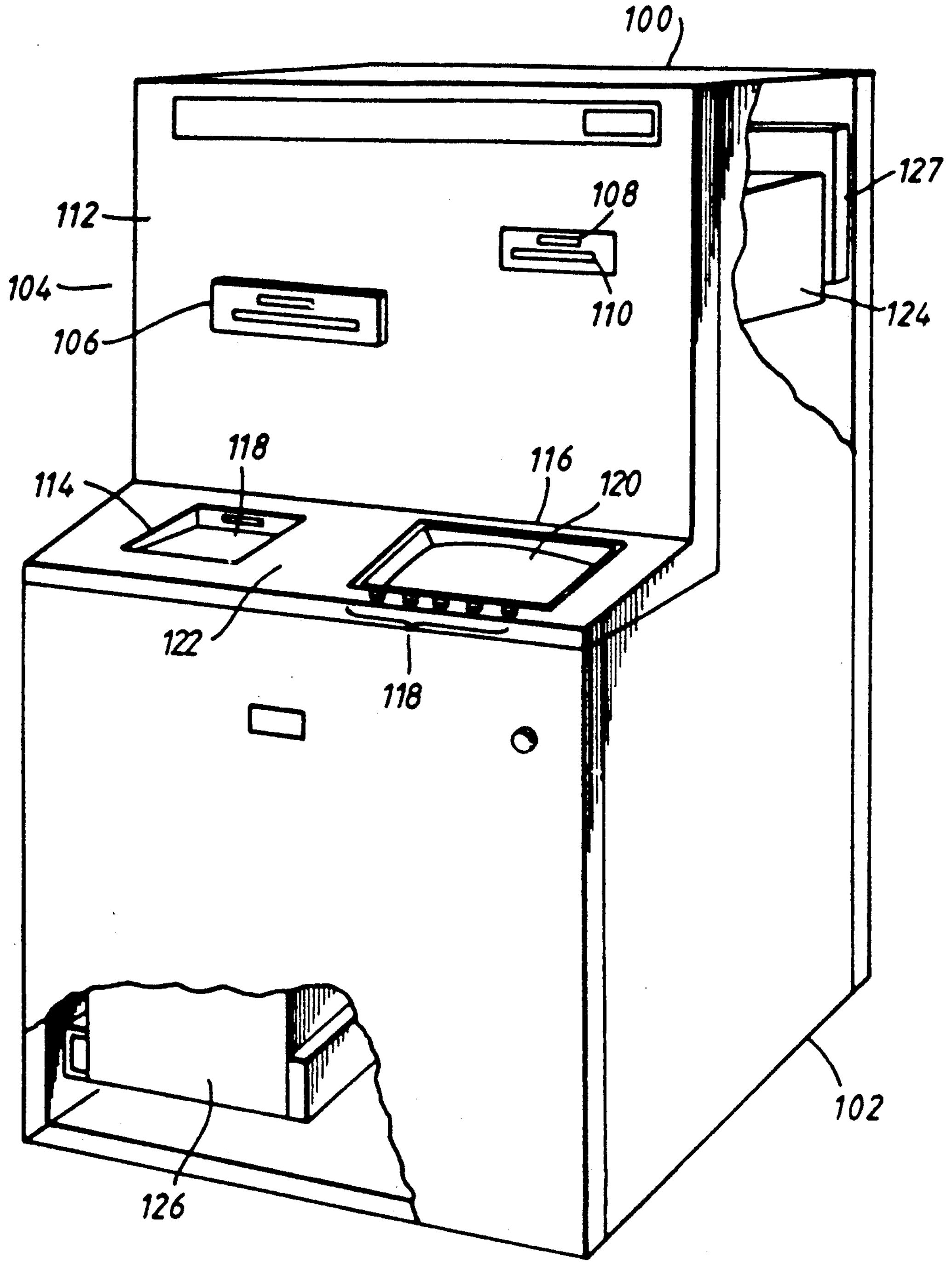
FIG. 1 is a partially cutaway perspective view of the ATM.

FIG. 1 shows a ATM 100 of an automatic bank note circulating system. The ATM 100 has a main body 102, and an operation panel 104 is provided at the customer side of the main body 102. A passbook insertion port 106, a card insertion port 108 and a receipt dispensing port 110 are formed in a vertical panel portion 112 of the operation panel 104. A bank note inlet/outlet port 114 which serves as both a bill inlet port and outlet port, an operation section 116 having a plurality of operation buttons 118, and an instruction display section (i.e., CRT display unit) 120 are provided in a horizontal panel portion 122 of the operation panel 104.

A passbook reader/printer 123 (not shown in FIG. 1) and a card/receipt processing unit 124 (not shown in FIG. 1) are arranged in the main body 102. The passbook reader/printer 123 reads magnetic information on a passbook received through the passbook insertion port 106, records the read magnetic information, and prints a transaction content on the passbook. The card-/receipt processing unit 124 deals with a magnetic card inserted through the card insertion port 108, produces a receipt and dispenses it through the receipt dispensing port 110, and prepares a journal duplicate. The main body 102 also contains a bank note receiving/dispensing mechanism 126 for dispensing received bank notes, and an internal monitor unit 127 for monitoring a state of the ATM.

The construction of the bank note receiving/dispensing mechanism 126 will be described with reference to FIG. 2.

Figure 2:
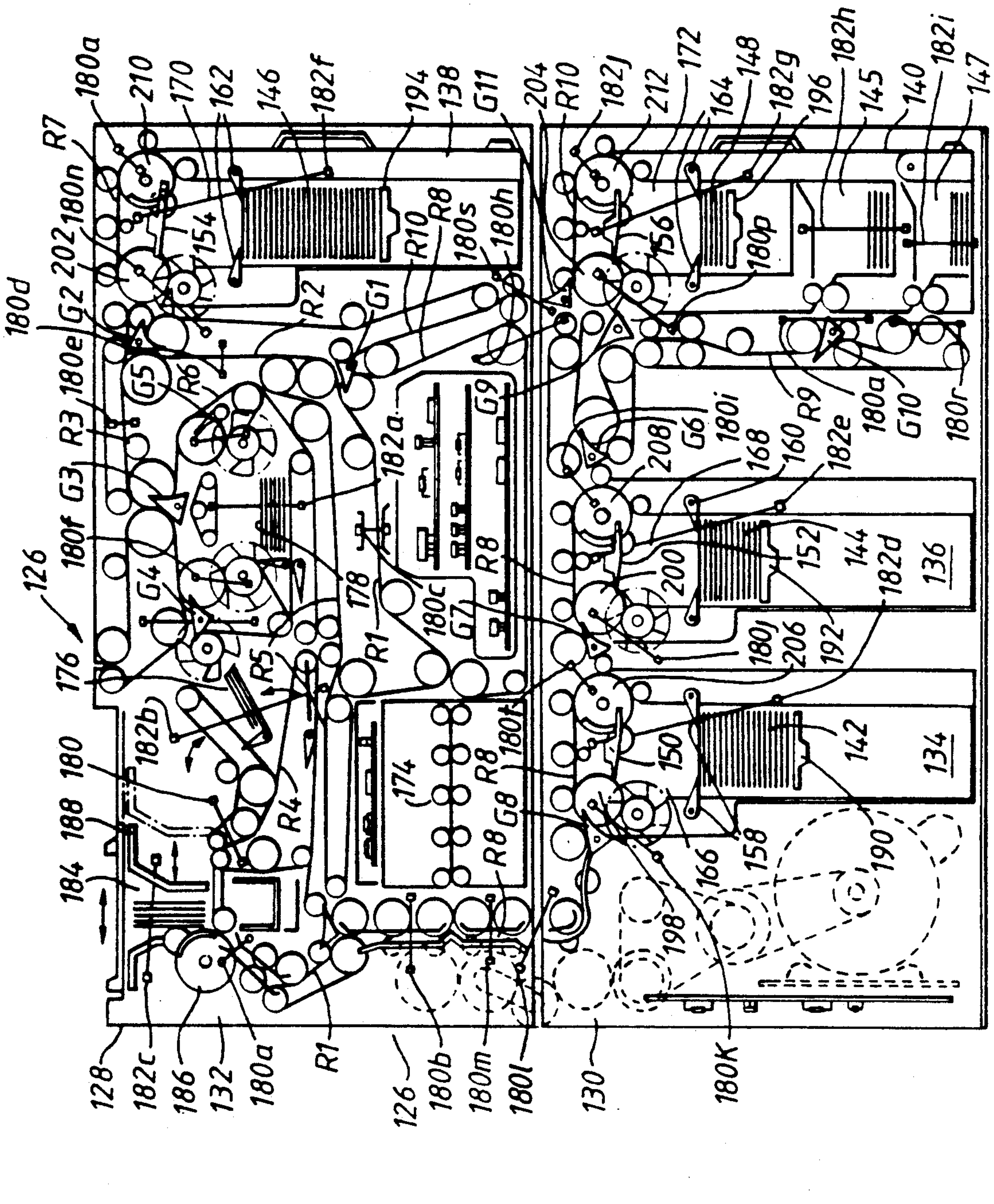
FIG. 2 is a sectional views schematically showing of a bill receiving/dispensing mechanism of the ATM.

As shown in FIG. 2, bank note receiving/dispensing mechanism 126 including a upper unit 128 and a lower unit 130. A bank note receiving/dispensing unit 132 is provided in the upper portion of the front side (customer side) of the upper unit 128, so as to oppose the bank note inlet/outlet port 114. First and second bank note cassettes 134 and 136 are arranged in the lower unit 130. A third bank note cassette 138 is arranged at the rear of the upper unit 128 A forth bank note cassette 140 is arranged in the lower unit 130.

The first to fourth bank note cassettes 134 to 140 include a first storage section 142 for storing the bank note of a first denomination (i.e., $100 or DM 100), a second storage section 144 for storing the bank note of a second denomination (i.e., $10 or DM 10), a third storage section (first loading/recovery compartment) 146 for storing loading and recovering bank note, and a forth storage section (second loading/ recovery compartment) 148 for storing loading and recovered bank note and a third denomination (i.e., $50, 10, DM 50) which are unit for dispensation, , a fifth storage section 145 for storing the rejected bank note, and sixth storage section 147 for storing the remaining bank note, respectively.

First, second, third and fourth bank note stacking member 150, 152, 154 and 156 are vertically disposed at the top of storage sections 134, 136, 138 and 140. Separator 158, 160, 162 and 164 function as partitioning means for distinguishing the present transaction from the previous transaction, and are disposed in the storage sections 134, 136, 138 and 140 respectively. Temporary storage sections 166, 168, 170 and 172 are formed between the separator 158 and the member 150, between the separator 160 and the member 152, between the separator 162 and the member 154 and between the separator 164 and the member 156, respectively.

A discrimination unit 174 is provided in the upper unit 128. A dispensing temporary stacking section 176 and a depositing temporary stacking section 178 are disposed at the upper side of the discriminating unit 174.

The dispensing temporary stacking section 176 temporary stacking the bank notes to be dispensed. The second temporary stacking section 178 temporary stacks a deposited bank notes.

Bank note convey paths R are formed in the upper and lower unit 128 and 130 so as to convey the bank note to the corresponding sections. More particularly, the convey paths R consist of a first conveying path R1 for conveying the bank note A from the bank note receiving/dispensing unit 132 through the discrimination unit 174 to a first branch disposed between the discrimination unit 174 and the depositing temporary stacking section 178; a second conveying path R2 for conveying the bank notes from the first branch to a second branch disposed between the discrimination unit 174 and the third bank note cassette 138; a third convey path R3 for conveying the bank notes from the second branch to the depositing temporary stacking section 178; a forth conveying path R4 for conveying the bank notes from the depositing temporary stacking section 178 to the bank note receiving/dispensing unit 132; a fifth conveying path R5 conveying the bank notes from the depositing temporary stacking section 178 to a marge portion of the first conveying path R1 which is located at the inlet port of the discrimination unit 174; a sixth conveying path R6 for conveying the bank notes from a third branch disposed between the second branch and the depositing temporary stacking section 176 to a inlet of the fifth conveying path R5; a seventh conveying path for conveying the bank notes from the third storage section 146 to the second branch; a eighth convey path for conveying the bank notes from the first branch to the merge portion of the first conveying path R1; a ninth conveying path for conveying the bank note from the branch portion on the eighth convey path to the sixth storage section 145; a tenth conveying path for conveying the bank notes from the forth storage section 140 to the first branch portion.

First to eleventh selector gates G1 to G11 are disposed at the first to tenth branches, respectively. Each selector gate guides the bank notes which reached the corresponding branch to one of the two corresponding convey paths. The selector gates G1 to G10 are driven by rotary solenoids (not shown), respectively. Flow sensors 180*a* to 180*r* are arranged at respective predetermined positions of the convey paths R. Bank note presence/absence sensors (residual bank notes sensors) 182*a* to 182*i* are disposed at respective stacking locations of the bank notes. Each of the sensors 180*a* to 180*r* and 182*a* to 182*i* compr:ses a known pair of a light-emitting element and a light-receiving element.

The bank note receiving/dispensing unit 132 has a bank note storage chamber 184 and bank note take-in roller 186 for taking in the bank note stored in the bank note storage chamber 184. The bank note are taken in, one by one, upon rotation of the take-in roller 186 and are fed to the first conveying path R1.

A back up member 188 is arranged opposite to the take-in roller 186. The back up member 188 is respectively defined by opposing surfaces of the take-in roller 186 and an outlet portion of the forth conveying path R4.

The first, second, third, fourth bank note storage section 142, 144, 146, and 148 having separators 158, 160, 162, and 64. Back up members 190, 192, 194, and 196 supporting the bank notes are disposed in the first to forth storage section 144 to 150, respectively. The separator 158, 160, 162, and 164 are energized by solenoids (not shown) inserted into and removed from the storage section 134, 136, 138 and 140, respectively. The back up member is movable along a horizontal direction. Take in rollers 198, 200, 202 and 204 are disposed at the upper portion of the left side of the temporary storage sections 166, 168, 170 and 172, respectively. The take in rollers 198, 200, 202 and 204 are taking in the bank notes conveyed from the eighth convey path R8 into each of the temporary storage sections. The take out rollers 206, 208, 210 and 212 are disposed at the upper portion of the right side of the temporary storage sections 166, 168, 170 and 172, respectively. The take out rollers are taking out the bank notes stored in the each of the storage sections 142, 144, 146 and 148. Stacking member 150, 152, 154 and 156 are arranged at upper portion of the temporary storage sections 166, 168, 170 and 172, respectively. The stacking member 150, 152, 154 and 156 are movable to a downwardly direction, so as to stacks the bank note stored in the each of temporary storage sections 166, 168, 170 and 172 into the storage sections 142, 144, 146 and 148.

When the bank notes are stacked in the temporary storage section 166, the separator 158 is located in storage section 142 for separating the present transaction from the previous transaction. When the transaction is completed , the separator 158 are moved to the outside of the storage section 142. Thereafter, the stacking member 150 moves to the downwardly for stacking the bank note into the storage section 142. During the dispensing transaction, the separates 158 are moved to the outside of the storage section 142. Back up member moves in the upwardly direction. Thereafter, upon rotation of the take out roller 206, the bank notes stored in the storage section are taken out one by one.

Figure 3:
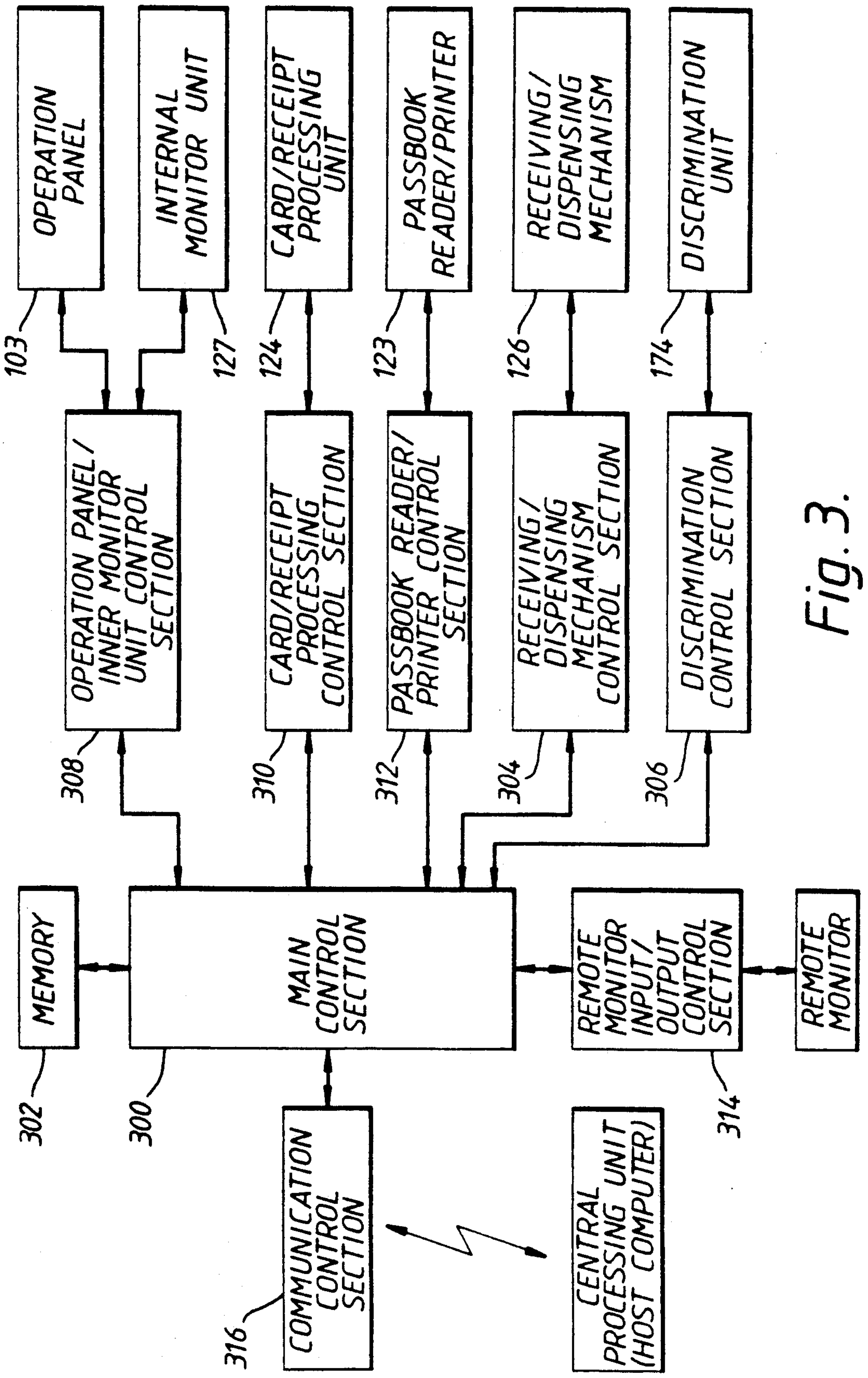
FIG. 3 is a schematic block diagram of a control system of the ATM.

FIG. 3 is a block diagram for explaining the operation of the ATM 100. A main control section 300 controls the overall operation of the ATM 100. A memory 302 such as a ROM (read-only-memory) stores a control program or the like. A receiving/dispensing mechanism control section 304 controls the receiving/dispensing mechanism 126 in accordance with the signal from the main control section 300 and the signal from a discrimination control section 306. The discrimination control section 306 controls the discrimination section 174. An operation panel/internal monitor unit control section 308 controls the operation panel 103 and the internal monitor unit 127. A card/receipt processing control section 310 controls the card/receipt processing unit 124. A passbook reader/printer control section 312 controls a passbook reader/printer 157 for reading magnetic stripe information from the passbook inserted through the passbook insertion port 110 and printing the transaction contents on the passbook and a journal.

More specifically, the main control section 300 counts the number of bank note stored into the storage sections 142, 144 and 148, the number of loaded bank note, and the total number of bank note in units of denominations, in accordance with the signals from the sensors 180*a* to 180*r* in the receiving/dispensing mechanism 126 and the discrimination signal from the discrimination section 174. The main control section 300 controls the system through a remote monitor input/output control section 314. A remote monitor 316 disposed to be spaced apart from the ATM 100. Furthermore the main control section 300 exchanges data with a central processing unit serving as a host computer via a communication control section 316.

Figure 4A:
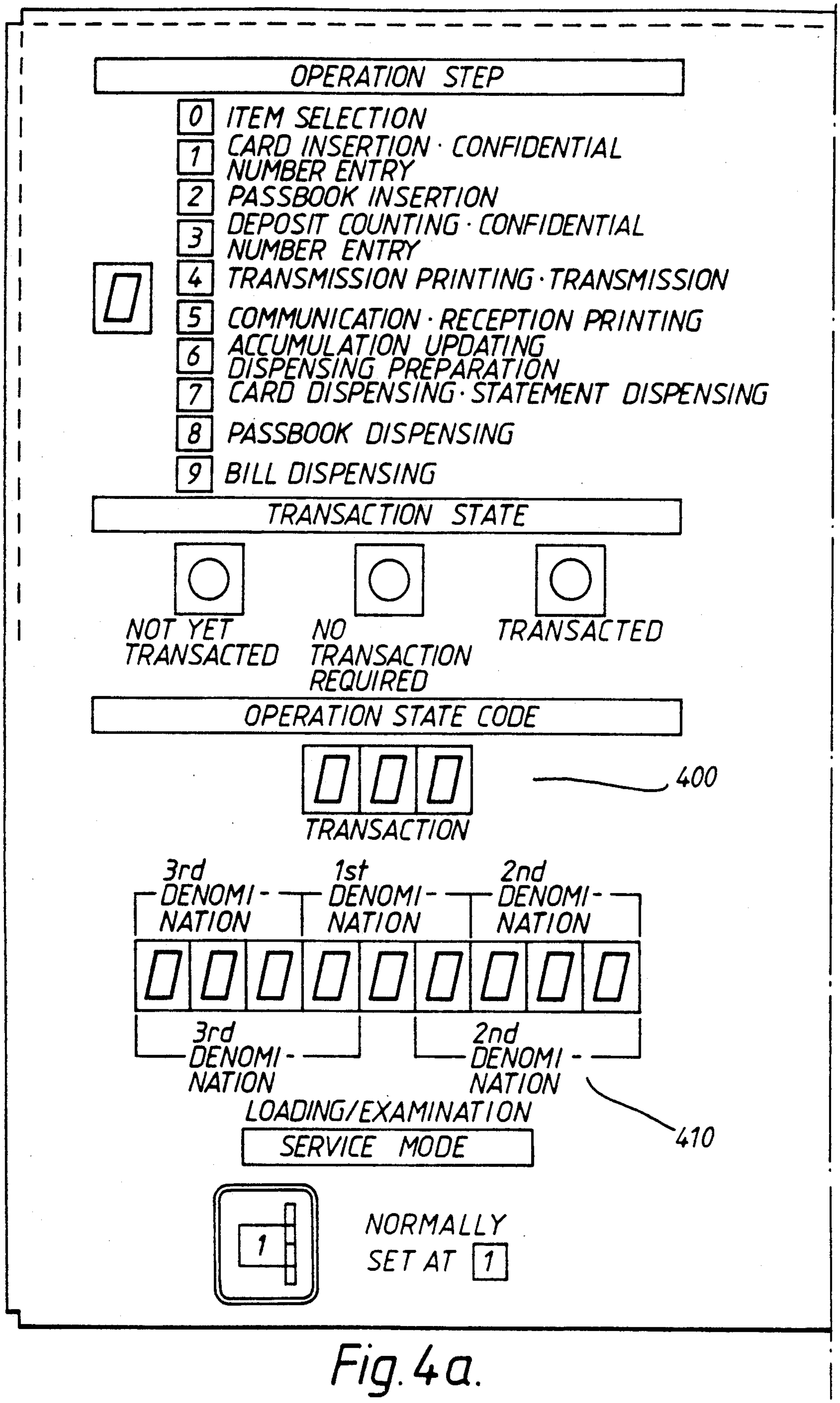
FIG. 4 is a plan view of an internal monitor of the ATM.
Figure 4B:
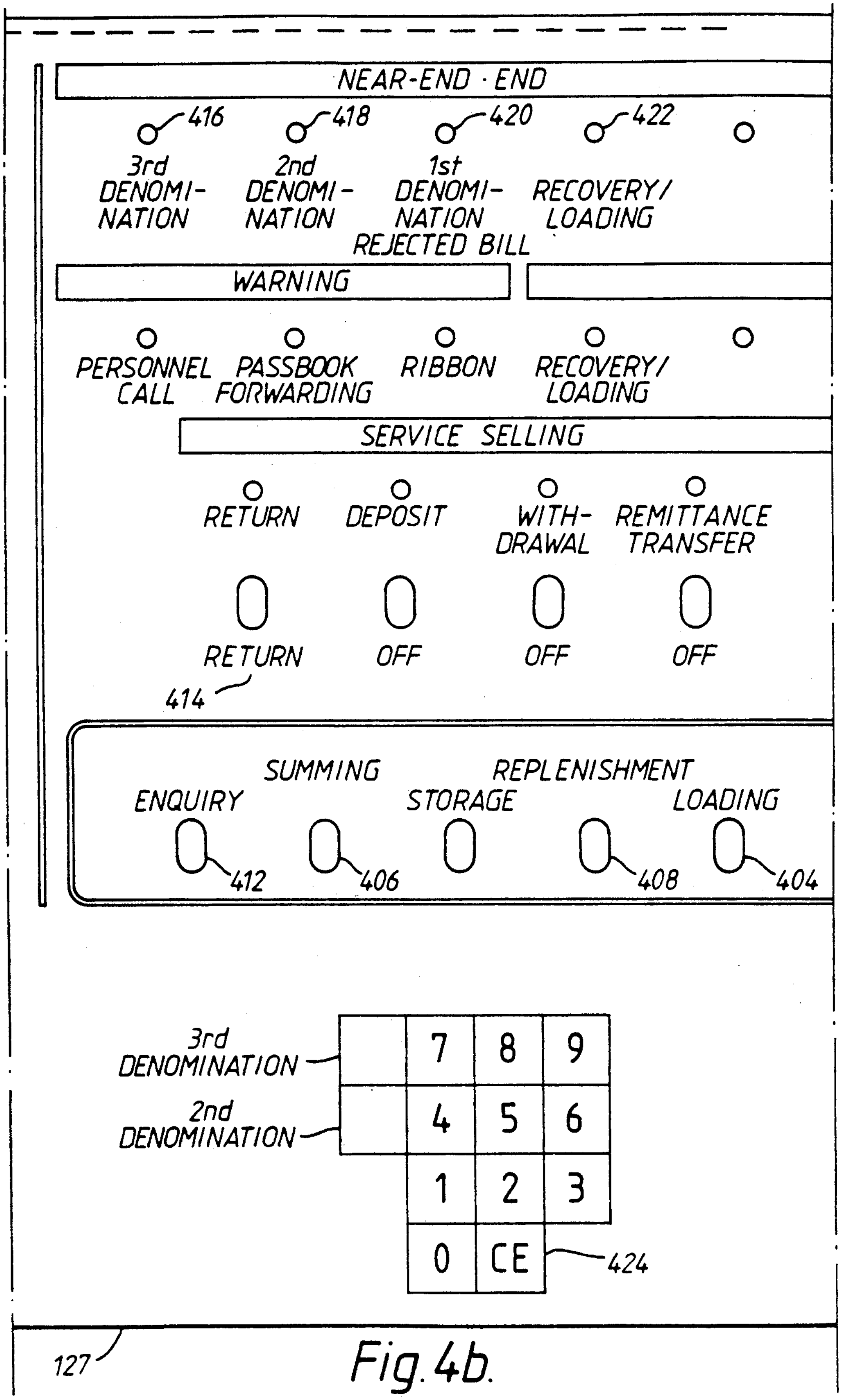
Figure 4C:
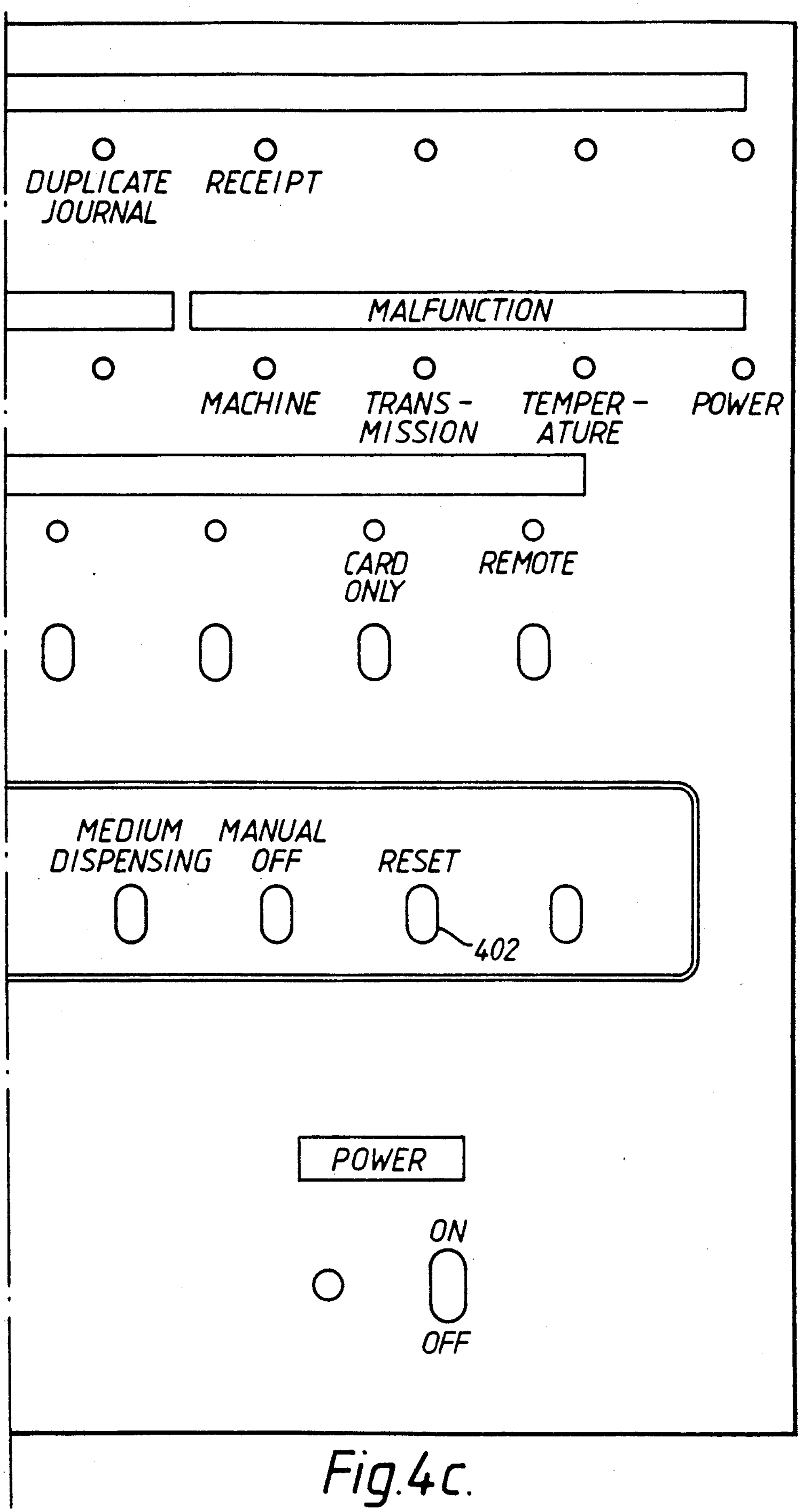

The internal monitor unit 127 comprises as shown in FIG. 4, an operating state code display 400, a reset button 402, a loading button 404, a summing button 406, a replenishing button 408, a bank notes number display 410 for displaying the number of bank notes of each of the first to third denominations, an inquiring button 412, a bank note return button 414, an indicator 416 for indicating a low level of bank notes of the third denomination in the third storage section 146 in a flashing state and the end of bank notes therein in a continuously on state, an indicator 418 for indicating a low level of bank notes of the second denomination in the second storage section 144 in a flashing state and the end of bank notes therein in a continuously on state, an indicator 420 for indicating ending of bank notes of the first denomination in the first storage section 142 in a flashing state and the end of bills therein in a continuously on state, an indicator 422 for indicating recovering/loading and a keyboard 424 having numerical denomination sort keys.

The operation of the automatic transaction apparatus in such construction is explained hereinafter with reference to FIGS. 5 to 14.

Figure 5:
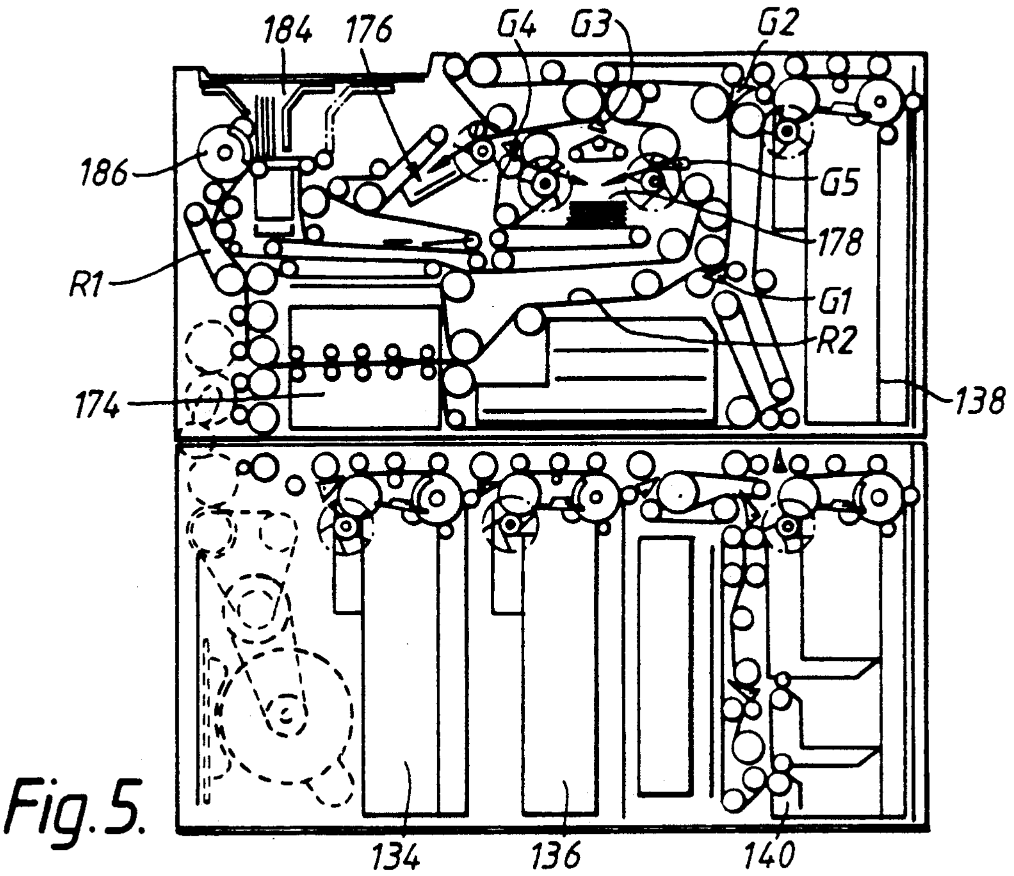
FIG. 5 and 6 are side views showing bank note flow when bank notes are received.
Figure 6:
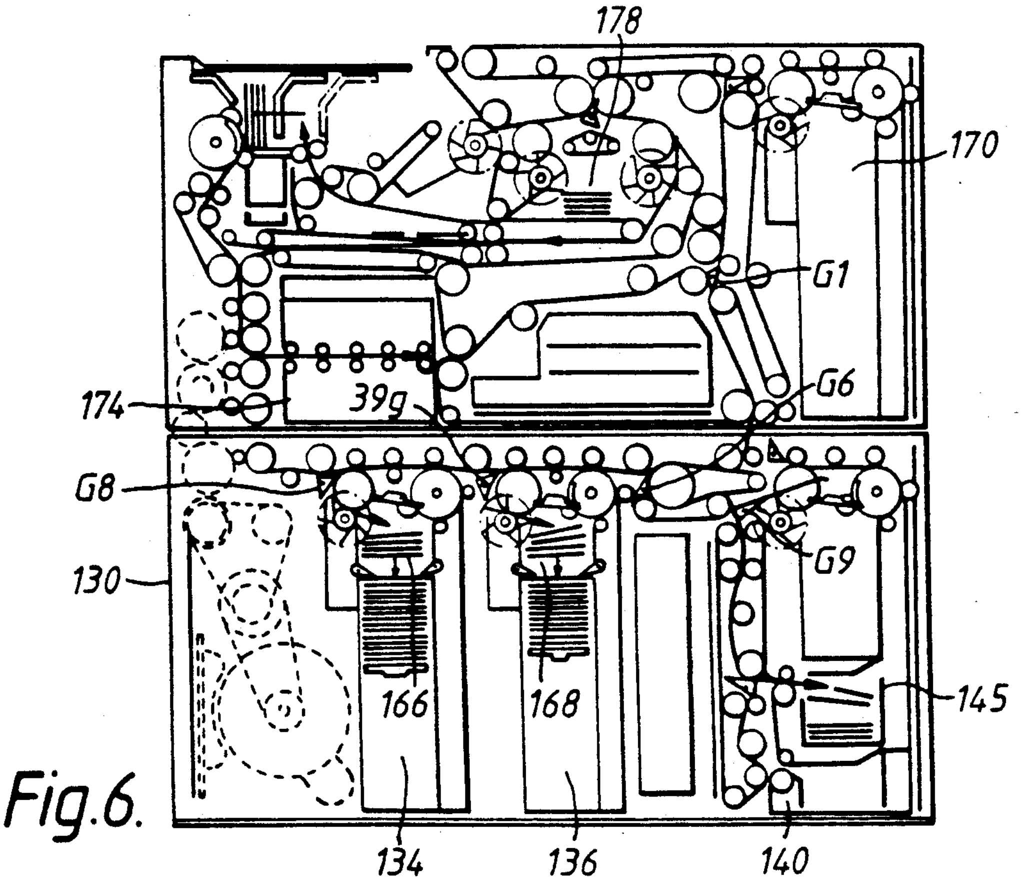

FIG. 5–FIG. 6 are diagrams illustrating the bank note receiving operation.

When a customer specified a deposit transaction, the customer puts a mixed kind of bank notes A into the bank note receiving chamber 184. When the customer closes the inlet/outlet port 114, the take-out roller 186 starts to rotate to take in the bank notes one by one. As shown in FIG. 5, the bank notes A are conveyed through the first conveying path R1 to the discrimination unit 174. The discrimination unit 174 discriminates the denomination of bank notes A, Whether they are counterfeit, and their orientation (reverse or obverse). Any counterfit bank notes are conveyed through the first gate G1, the second gate G2, the third gate G3 and forth gate G4 and stacked in the dispensing temporary stacking section 176.

The reverse sided bank notes are guided by the forth gate G4, turned over, and then stacked in the depositing temporary stacking section 178. The obverse side bank notes are guided by the third gate G3 and fifth gate G5, and stacked in the depositing temporary stacking section 178. Thus, authentic the bank notes A are properly arranged and collected in temporary stacking section 178.

The rejected bank notes stacked in the dispensing temporary stacking section 176 are then discharged to the bank note receiving chamber 184 when the bank notes A in that chamber 184 are exhausted. Thereafter the inlet/outlet port 114 is opened and the rejected bank notes are returned to customer.

When a user depress the confirmation indication on the CRT display 118, the bank notes A collected in the depositing temporary stacking section 178 are again took in and conveyed by the fifth convey path R5.

As shown FIG. 6, the bank notes A are conveyed by the fifth conveying path R5 and are examined by the discrimination unit 174. The bank notes are conveyed to the lower unit 130 by the first gate G1 and the eight convey path R8.

The first denomination of bank notes identified by the discrimination unit 174 are guided by the eight gate G8 and are stacked in to the first temporary stacking section 166. The second denomination of bank notes are guided by the seventh gate G7 and are stacked into the second temporary stacking section 168. The third denomination of bank notes and rejected bank note are guided by the sixth gate G6 and ninth gate G9 and then are stacked int he forth temporary stacking section 172. When all the bank notes A are stacked int he first, second and forth temporary stacking section 166, 168 and 172, the stacked bank notes are pushed downwardly by the stacking member 150, 152 and 156, respectively.

Figure 7:
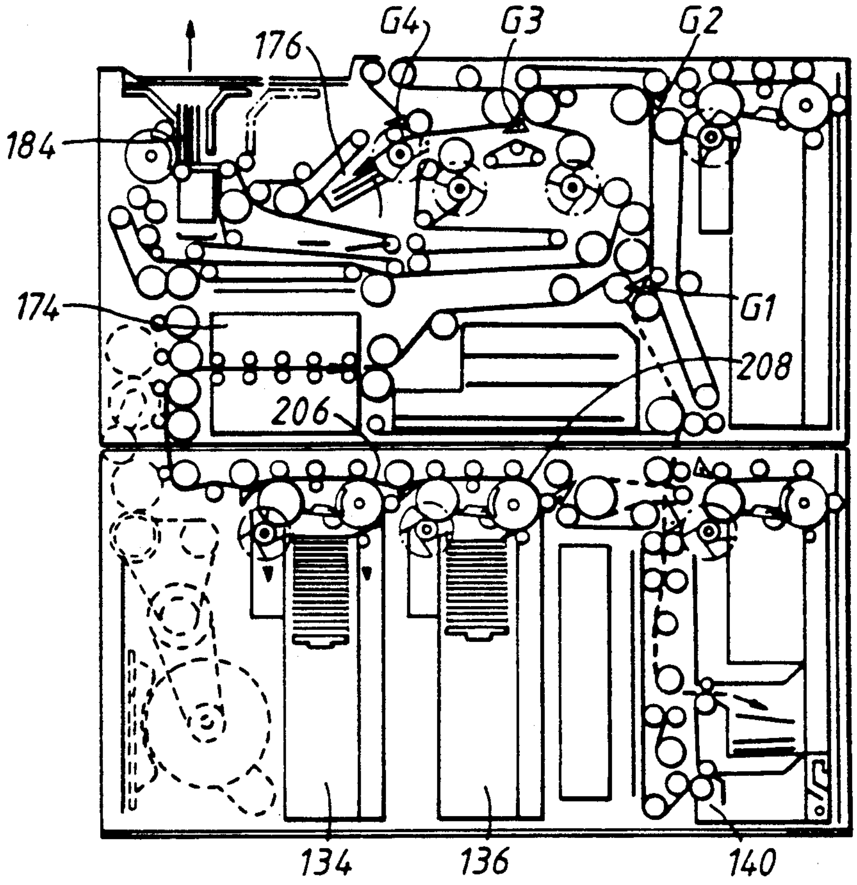
FIG. 7 and 8 are side views showing a bank notes flow when bills are dispensed to the customer.
Figure 8:
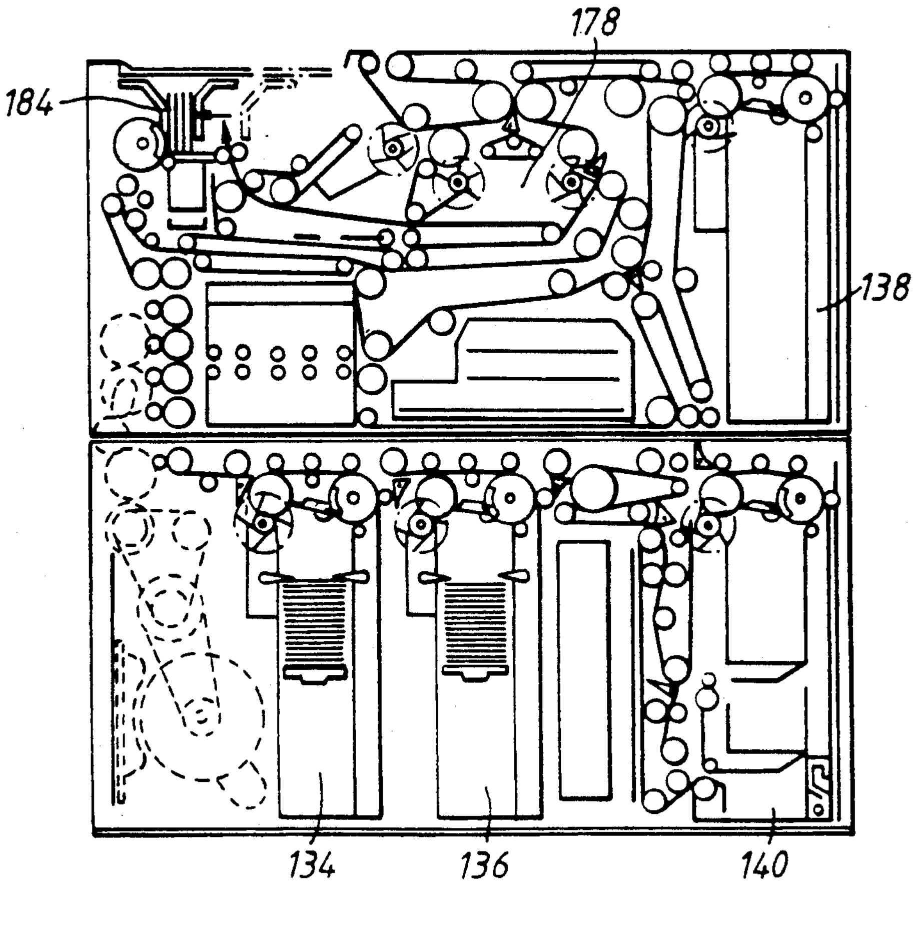

The cash withdrawal operation will now be explained referring to FIGS. 6 and 7.

First, when a customer selects a withdrawal transaction, instructions are displayed on the CRT to input amount to be paid. When amount to be paid is input, the first and second denomination of the bank notes A in the respective bank note storage section 142 and 144 are pushed upward by the bank up member 190 and 192.

The first and second denomination of the bank notes are then taken out by the take-out rollers 198 and 200. The bank note are led to the upper unit 128 and led to the discrimination unit 174. As shown in FIG. 6, the bank notes are stacked into the dispensing temporary stacking section 170 via the first gate G1, second gate G2, third gate G3 and fourth gate G4. When the bank notes equal the amount of the withdrawal, the taking-out of bank notes is stopped, and, as shown FIG. 7 the bank notes stacked in the payment temporary stacking section 176 are discharged to the bank note receiving chamber 184. Any rejected bank note are stacked into the fifth storage section 148 via the first gate G1, eleventh gate G11, sixth gate G6, ninth gate G9 and tenth gate G10.

Figure 9:
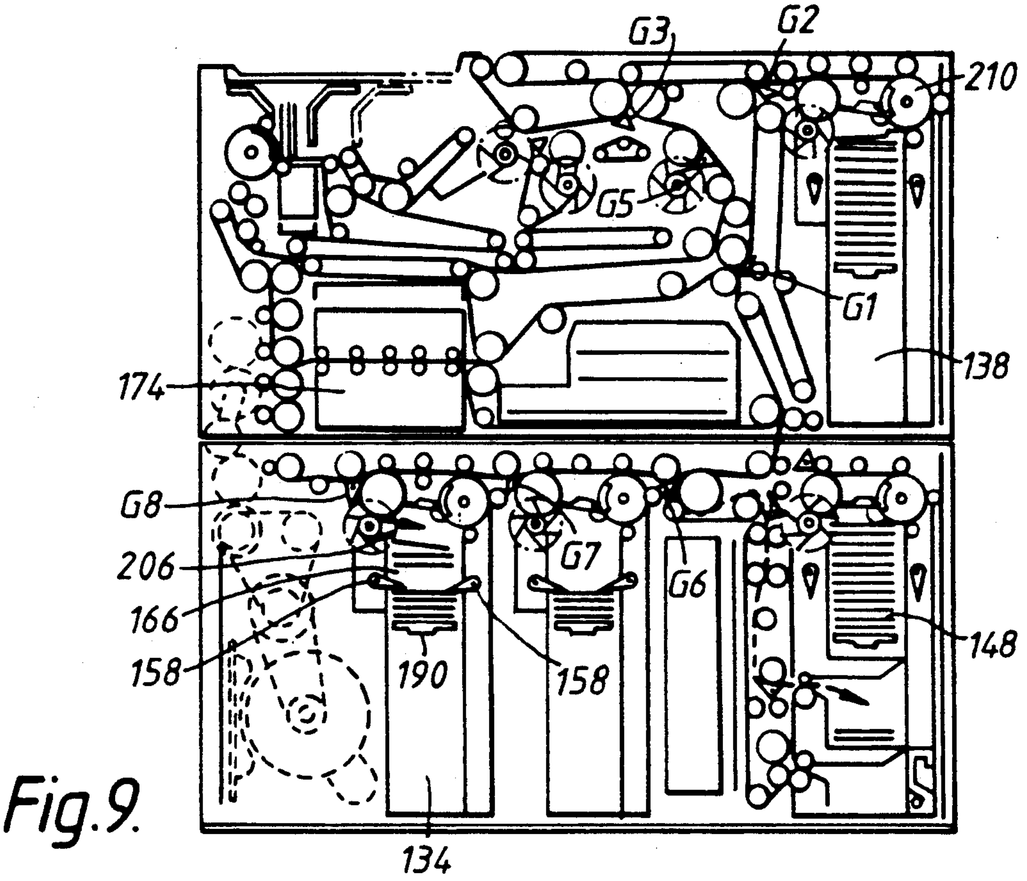
FIGS. 9 and 10 are side views showing a bank notes flow when the bank notes are loaded.
Figure 10:
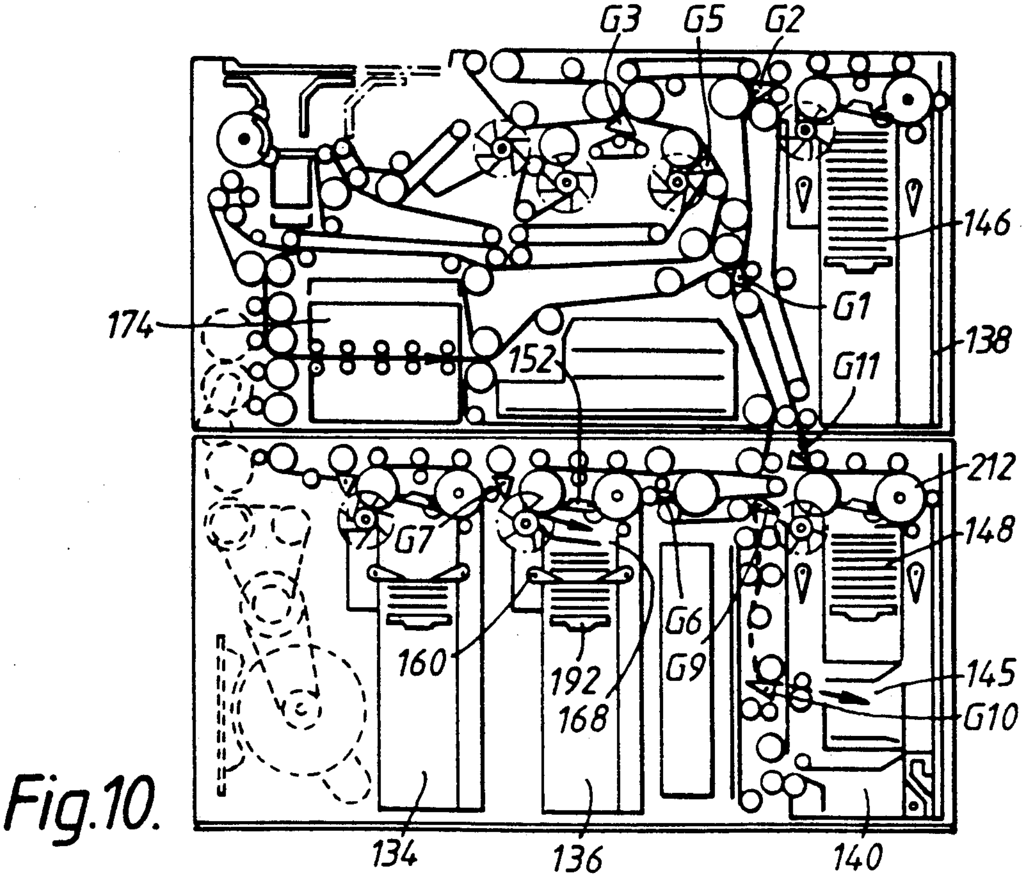
Figure 11:
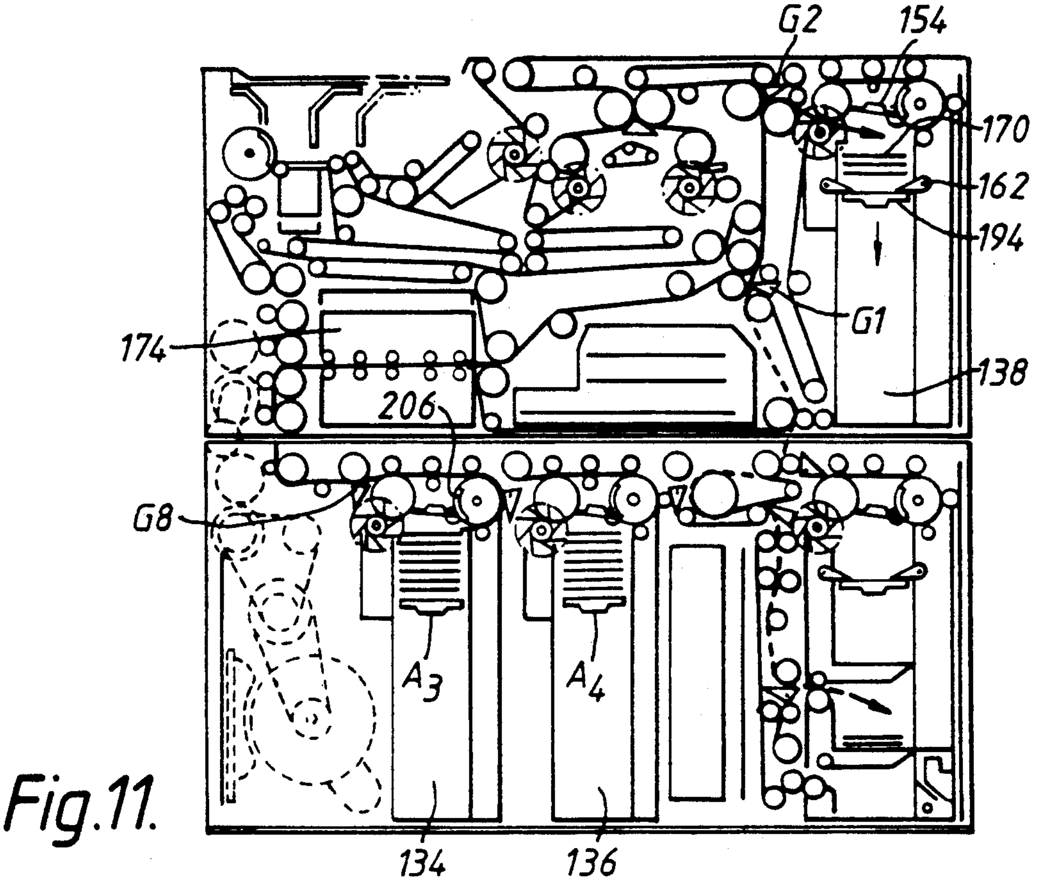
FIG. 11 and 12 are side views showing a bank notes flow when the bank notes are recovered.
Figure 12:
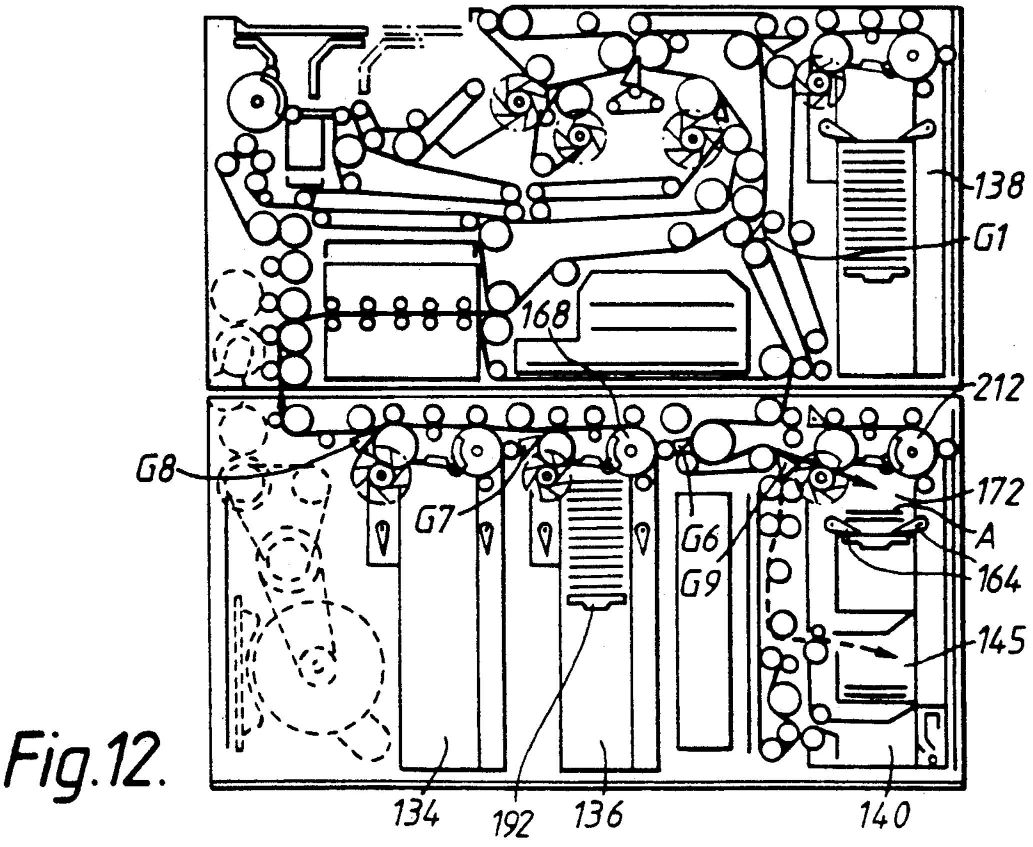
Figure 13:
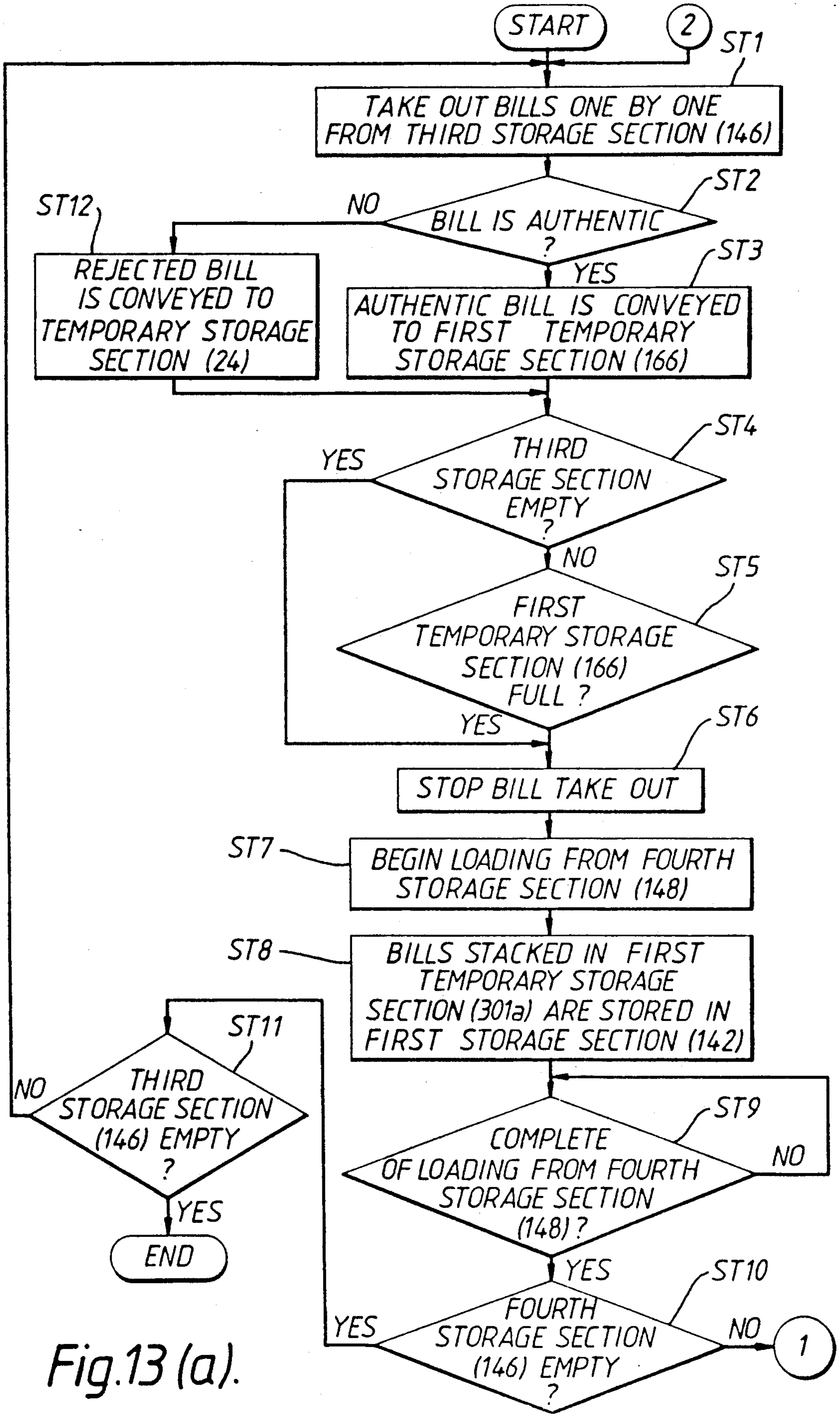
FIGS. 13(*a*) and 13(*b*) are flow charts for explaining the loading operation.
Figure 13B:
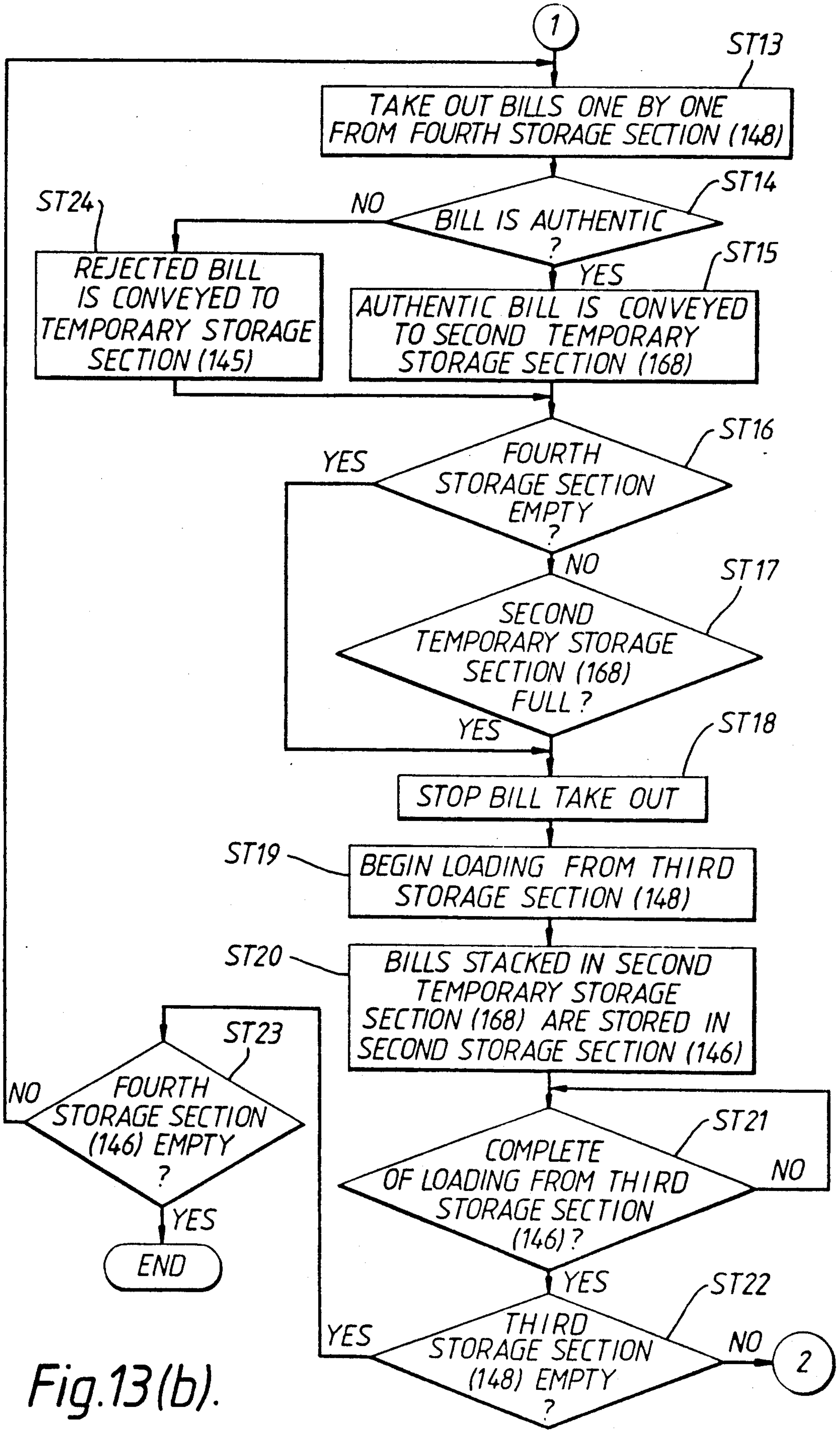
Figure 14A:
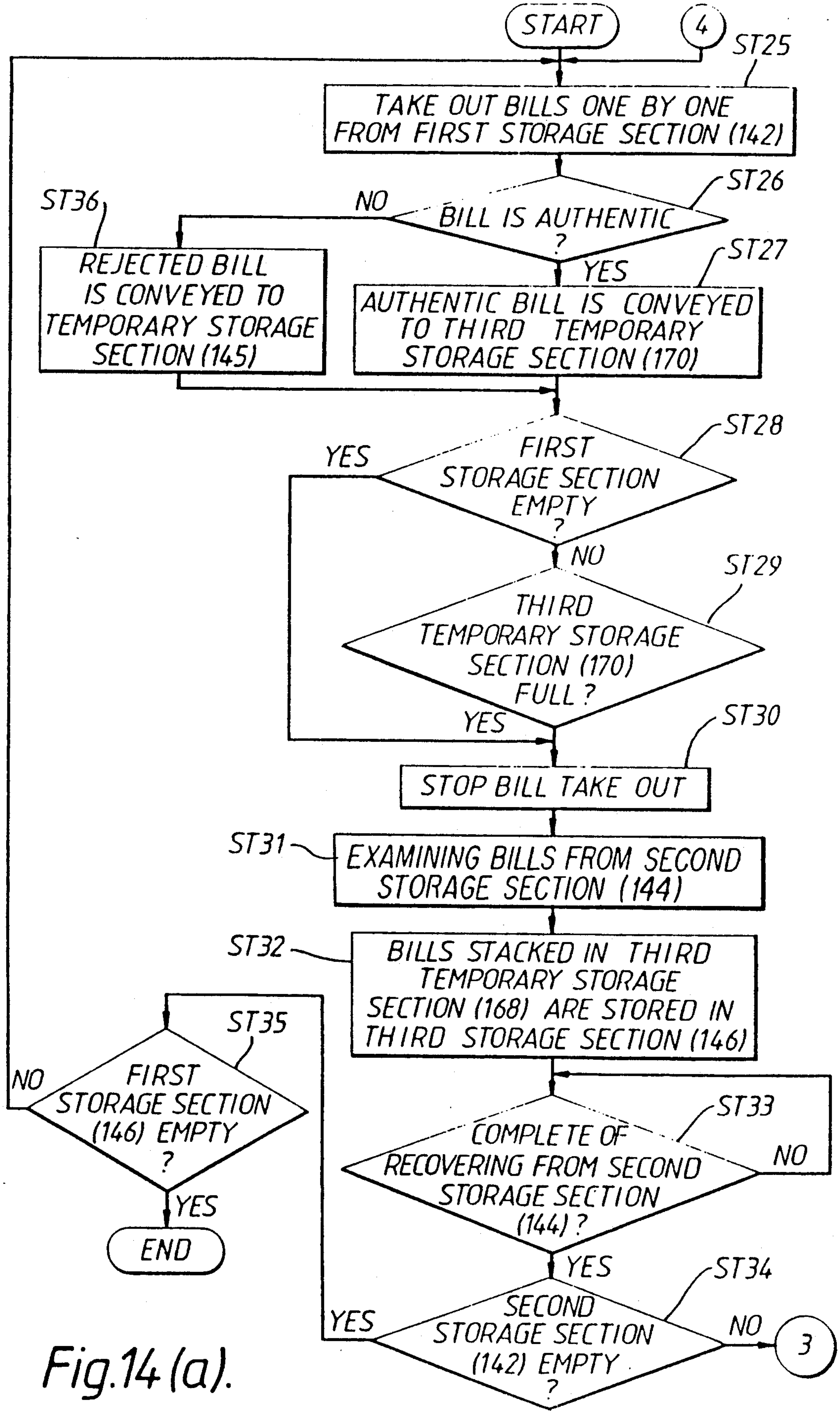
FIGS. 14(*a*) and 14(*b*) are flow charts for explaining the recovering operation.
Figure 14B:
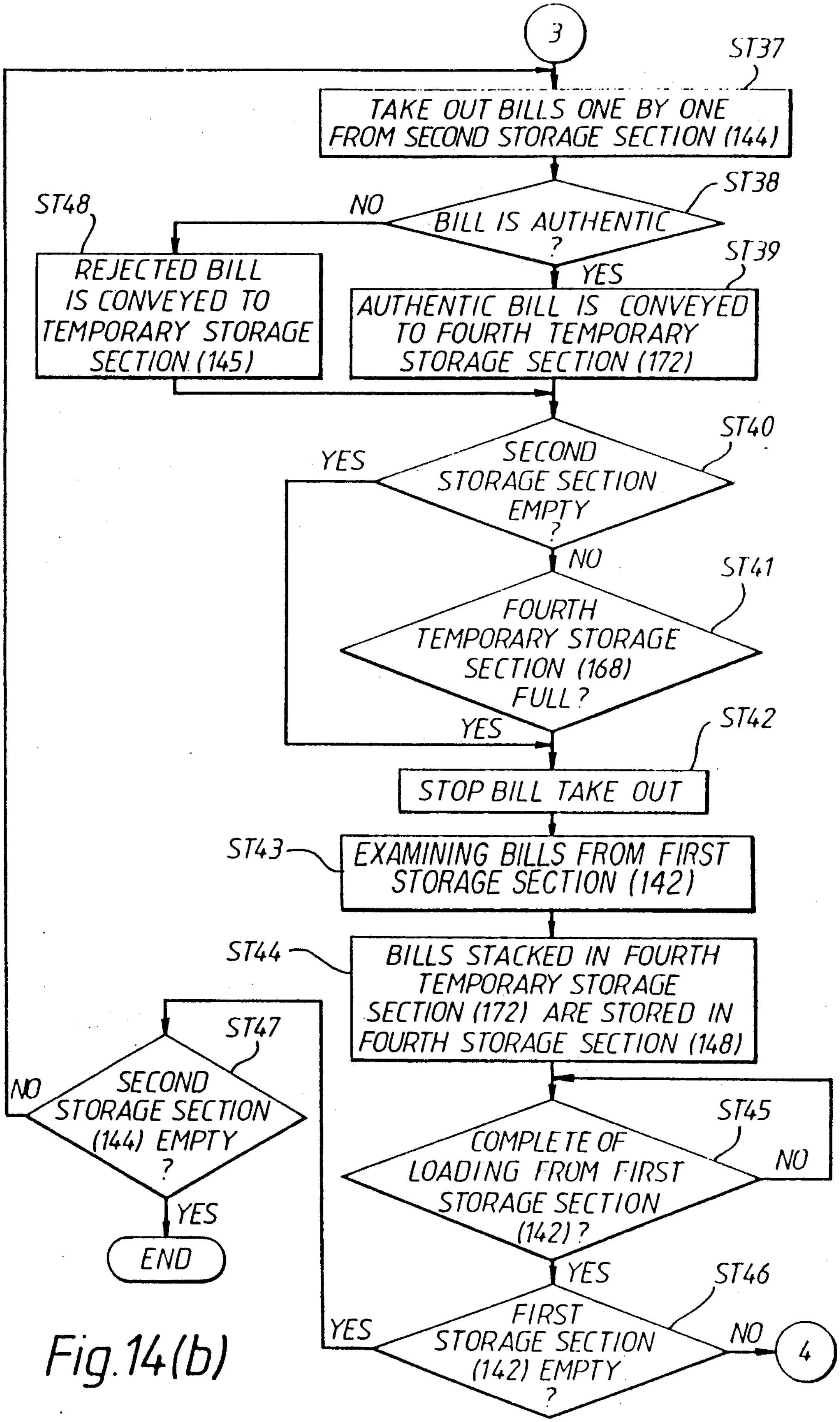

Next, the alternately loading (replenishing) operation will now be explained referring to FIG. 9, FIG. 10, FIG. 13(*a*) and FIG. 13 (*b*).

First, the bank note loading mode is selected by the operator by using the internal monitor unit 127. Then, a first denomination of bank notes is set in the third cassette 138, a second denomination of bank note is set in the forth cassette 140 and the loading starts.

The first denomination of bank notes set in the third storage section 146 are taken out one by one by the take-out roller 210 (ST1) and convey to the discrimination unit 174, where, they are judge by the discrimination unit 174 (ST2). The authentic and truth bank notes are conveyed via the second gate G2, the third gate G3, the fifth gate G5, first gate G1, ninth gate G9 and eight gate G8, and collected in the first storage section 166 (ST3). At this time, the third storage section 166 is checked to determine if it is empty (ST4). Thereafter, main control section 300 checks whether the first temporary storage section is full or not (ST5), when the third storage section 166 is empty or the first temporary storage section is full the tank-out operation is suspended (ST6). At this time, the main control section causes the receiving/dispensing mechanism 126 to start loading from the forth storage section (ST7).

The bank notes stacked into the storage section 166 are pushed down below the separator 15 by the stacking member 150 (ST8). At this time, the separator 158 is turned downward by the pushing force of the stacking member 150. As a result, the bank notes, are forced to get under separator 158. When the bank notes are under the separator 158 completely, the pushing force applied to the separator 158 is removed and the separator returns to the original state.

Thereafter, the stacking member 150 returns to the uppermost position and the backup 190 also tries to return upwardly. Thus, the bank notes A1 are clamped between the backup 190 and the separator 158 and the stacking operation ends (ST8).

The main control section checks whether the loading operation from forth storage section is completed. At the step 7 (ST7), main control section starts the loading from the forth storage section 148 if, at that, the loading operation from forth storage section is not completed.

When the loading operation from the forth storage section is completed, the loading operation from the third storage section 146 is repeated.

During the stacking operation in the first storage section 142, the second denomination of bank notes A2 set in the second cassette 140 are taken out one by one by the take out roller 212 (ST14). The bank notes are conveyed and counted (ST13), judged as to kinds of bank notes by the discrimination unit 174 (ST14) via the eleventh gate G11, 1st gate G1, second gate G2, third gate, G3 and seventh gate G7 and are stacked int he second storage section 144. Then, the forth storage section 148 is checked if it is empty (ST16). If not empty, it is checked if the second temporary storage section 168 is full or not (ST17). When the forth storage section 148 is empty or the first temporary storage section is full, the take-out operation is suspended (ST18). At this time, the main control section causes the bank note receiving/dispensing mechanism 126 to start loading from the third storage section 146 (ST19).

The bank notes A2 collected in the second temporary storage section 168 are pushed down below the separator 160 by the stacking member 152. At this time, the separator 160 is caught by the bank notes A2 located below the back up member 152 and is turned downwardly by the pushing force of the back up member 152. As a result, the bank notes A2 are driven under the separator 160. When the bank notes A2 get completely under the separator 160, a pushing force applied to the separator 160 for return to the original state. Thereafter, the back up member 152 returns to the upper most part and the back up 192 also attempts to move upwardly. Thus, the bank notes A2 are clamped between the backup 192 and the separator 160 (ST20). During the stacking operation of the second cassette 136, the loading operation from the third storage section is resumed.

At the step 22, the forth storage section 148 is not empty, the loading operation from the third storage section 148 is resumed to take the bank notes A1 from the third storage section 146 (ST1) so that the loading operation from the third storage section 142 and loading operation from the forth storage section 148 are alternately performed. By repeating the series of operations as described above, the bank notes A1 and A2 are loaded in the first and second storage section 142 and 144.

When both the third storage section 146 and the forth storage section 148 are emptied (ST10,11), the bank note loading operation ends.

After banking hours in the evening or before banking hours the next morning, a bank clerk sets a third cassette 138 and a forth cassette 140 (summary cassette) in the ATM 100. Bank clerk depress the summing button 406 of the internal monitor unit 127. Upon depression of the summing button 406, the main control section 300 is set in the recovering mode and supplies a recovering command to the bank note receiving/dispensing mechanism 126. The bank notes stacked in the first storage section 142 are taken out one by one by the take-out roller 206 (ST25). The bank note are judged in the discrimination unit 174. The bank note are conveyed via the eight gate G8, and then stacked in the third temporary storage section 170 via the first gate G1 and second gate G2 (ST26). Then, whether the first storage section 142 is emptied or not is confirmed (ST28). Furthermore, whether the first temporary storage section 166 is full or not is checked (ST29). When the third storage section 144 is empty or the first temporary storage section 166 is full, the taking out of the bank notes A3 from the first storage section 142 is suspended (ST30). At this time, the main control section 300 causes the receiving/dispensing mechanism 126 to start the recovering operation from the second storage section 144 (ST31). The bank notes A3 stacked into the third temporary storage section 170 are pushed below the separator 162 by the backup 194 and the stacking member 154. At this time, the separator 162 is caught by the bank notes A3 located below the stacking member 154 and is turned downward by the pushing force of the stacking member 154.

When the bank notes A3 get under the separator 162 completely, the pushing force is applied to the separator 162 for return to the original position. Thereafter, the stacking member 154 return to the uppermost position and the backup 194 also tries to return upwardly. Thus, the bank notes A3 are clamped between the backup 194 and the separator 162 and the stacking operation ends (ST32).

At this time, the main control section 300 checks as to whether the recovering operation from the second storage section is completed.

At the step 31 (ST31), main control section 300 causes the start recovering operation from the first storage section 144 so that, at that time, the loading operation is not completed. When the recovering operation from the second storage section 144 is completed, the recovering operation from the first storage section is repeated.

During the stacking operation in the third cassette 138, the second denomination of bank notes A2 that are stored in the second storage section 146 are taken out one by one by the take out roller 208 (ST37). The bank notes are judges by the discrimination unit 174 (ST38) via the first gate G1, eleventh gate G11 and ninth gate G9 and are stacked in the forth storage section 148 (ST39). Then, the second storage section 144 is checked to determine whether it is empty (ST40). If it is not empty, the forth temporary storage section 172 is checked to determine it is full or not (ST41). When the second storage section 144 is empty or the forth temporary storage section 172 is full, the take-out operation is suspended (ST42). At that time, main control section 300 causes the bank note receiving/dispensing mechanism 126 to start the recovering operation from the first storage section 144 (ST43).

The bank notes A2 collected in the forth temporary storage section 172 are pushed down below the separator 164 by the stacking member 156. At this time, the separator 164 is caught by the bank notes A2 located blow the back up member 196 and is turned downward by the pushing force of the stacking member 156. As a result, the bank notes A2 are forced under the separator 164. When the bank notes A2 get under the separator 164 completely, the pushing force applied to the separator 164 is removed and the separator 164 returns to its the original state.

Thereafter, the stacking member 156 returns to the upper most position and the backup 196 also tries to return upwardly. Thus, the bank notes A2 are clamped between the backup 196 and the separator 164. During the stacking operation from the forth cassette 140, the recovering operation from the first storage section is resumed.

At the step 47, the first storage section 142 is not empty, the recovering operation from the first storage section 142 is resumed to take the bank notes A1 from the first storage section 142 (ST37) so that the recovering operation from the first storage section 142 and recovering operation from the second storage section 144 are alternately performed. By repeating as described above, the bank notes A1 and A2 are loaded in the rest and second storage section 142 and 144.

When both the first storage section 142 and the second storage section 144 are emptied (ST35,36,46,47), the recovering operation ends.

Further, if some bank notes are rejected in the discriminating unit 174 during the recovering operation, the rejected bank notes are conveyed and stacked in the fifth storage section 145 via the first gage 39*a*, sixth gate 39*f*, ninth gate 39*i*, and 10th gate 39*j* (ST36,48).

The above-mentioned operations in the loading and recovering operations are monitored by a clerk through the internal monitor 127 and when the loading and recovering ends, the counted number of bank notes are loaded and recovered, number of bank notes or amount by each denomination and total amount are printed and issued by the slip processing unit (not shown) and at the same time, this information is displayed on the internal monitor.

After the recovering operation, the third cassette 138 and the forth cassette 140 are takes out from the ATM 100 by the bank clerk (as shown in FIG. 15).

In the above embodiment, the third cassette 138 and the forth cassette 140 are used for the loading operation. When the first and second storage section store a same denomination, it is capable to use one of the third cassette 138 or the forth cassette 140 and alternately convey to the first and second storage section.

Furthermore, in the above embodiment, the bank notes in the first storage section are recovered to the third storage section, and the bank note in the second storage section are recovered to the forth storage section.

It is possible for the bank notes in the first storage section is recovered to the third storage section and the forth storage section alternately, and the bank notes in the second storage section to be recover to the third storage section and the forth storage section alternately and second denomination of the bank notes are mixed in the third storage section and the forth storage section.

What is claimed is:

1. An automatic bank note transaction apparatus comprising;

- a first and second storing means for storing bank notes;
- a bank notes dispensing port for dispensing bank notes;
- a first conveying means for conveying individual bank note from the first and second storing means to the bank note dispensing port;
- a loading means for loading bank notes into the bank note transaction apparatus;
- a second conveying means for conveying the bank note from the third storing means to the first and second storing means;
- control means responsive to a loading operation signal for causing the second conveying means to alternately convey a predetermined number of the bank notes into the first and second storing means until the first and second storing means are full.

2. The automatic bank note transaction apparatus of claim 1, wherein each of the first and second storing means comprises;

- a temporary storage section connected to the end of the second convey means;
- a storage section connected to the temporary storage section respectively; and
- a stacking means for stacking the bank note stored in the temporary storage section into the storage section.

3. The automatic bank note transaction apparatus of claim 2, wherein said control means further comprises:

- means for causing the second conveying means to convey the bank note from the third storing means to the second storing means while the bank note stored in the temporary storage section are conveyed into the storage section; and
- means for causing the second conveying means to convey the bank note from the third storing means to the first storing means while the second stacking means is stacking the bank notes stored in the temporary storage section into the storage section.

* * * * *